United States Patent
Whelan et al.

(10) Patent No.: US 9,204,104 B1
(45) Date of Patent: Dec. 1, 2015

(54) IMAGING AND SENSING ASSEMBLY, SYSTEM AND METHOD

(75) Inventors: David A. Whelan, Newport Coast, CA (US); John W. Hunter, Escondido, CA (US)

(73) Assignee: The Boeing Company, Chicago, IL (US)

(*) Notice: Subject to any disclaimer, the term of this patent is extended or adjusted under 35 U.S.C. 154(b) by 813 days.

(21) Appl. No.: 13/545,973

(22) Filed: Jul. 10, 2012

(51) Int. Cl.
*H04N 7/18* (2006.01)

(52) U.S. Cl.
CPC . *H04N 7/18* (2013.01); *H04N 7/185* (2013.01)

(58) Field of Classification Search
CPC .................................. H04N 7/18; H04N 7/185
USPC ....... 348/36, 144; 244/23 A; 102/489; 446/34
See application file for complete search history.

(56) References Cited

U.S. PATENT DOCUMENTS

| | | | |
|---|---|---|---|
| 4,356,770 A | 11/1982 | Atanasoff et al. | |
| RE32,094 E | 3/1986 | Atanasoff et al. | |
| 6,270,391 B1 | 8/2001 | Emilsson | |
| 6,666,145 B1 | 12/2003 | Nardone et al. | |
| 7,436,493 B2 | 10/2008 | McConville et al. | |
| 7,845,283 B2 * | 12/2010 | Finneral et al. | 102/489 |
| 8,006,623 B2 | 8/2011 | Dupont et al. | |
| 2007/0034738 A1 * | 2/2007 | Sanders et al. | 244/23 A |
| 2008/0108273 A1 * | 5/2008 | Alden | 446/34 |
| 2010/0026554 A1 | 2/2010 | Longman et al. | |
| 2012/0154521 A1 * | 6/2012 | Townsend et al. | 348/36 |

OTHER PUBLICATIONS

Jonathan R. Potts et al., "Frisbee™ Aerodynamics", AIAA 2002-3150, American Institute of Aeronautics and Astronautics, 20th AIAA Applied Aerodynamics Conference & Exhibit, Jun. 24-26, 2002, 15 pages.
Ralph D. Lorenz, "Flight and Attitude Dynamics Measurements of an Instrumental Frisbee™", Institute of Physics Publishing, Meas. Sci. Technol. 16 (2005) 738-748.

* cited by examiner

*Primary Examiner* — Allen Wong

(57) ABSTRACT

There is provided in one embodiment an imaging and sensing assembly. The imaging and sensing assembly has a disc shaped aerodynamic member configured to spin and self-position in flight, a plurality of pulsed thrusters positioned on the member, and a plurality of imaging and sensing devices positioned along a perimeter of the member. The imaging and sensing assembly further has one or more antenna devices positioned on the member and in communication with a first processor device on the member. The first processor device receives data obtained by the plurality of imaging and sensing devices and wirelessly transmits the data to a second processor device not positioned on the member. The imaging and sensing assembly further has a power supply powering the imaging and sensing assembly.

20 Claims, 12 Drawing Sheets

IMAGING AND SENSING ASSEMBLY, SYSTEM AND METHOD

CROSS REFERENCE TO RELATED APPLICATION

This nonprovisional patent application is related to contemporaneously filed U.S. nonprovisional patent application Ser. No. 13/545,978, titled "TARGET LOCATOR AND INTERCEPTOR IMAGING AND SENSING ASSEMBLY, SYSTEM AND METHOD", filed on Jul. 10, 2012, the contents of which are hereby incorporated by reference in its entirety.

BACKGROUND

1) Field of the Disclosure

The disclosure relates generally to devices, systems and methods for imaging and sensing, and more particularly, to devices, systems and methods for imaging and sensing locations and objects to obtain data for use by flight vehicles, ground vehicles, and the like.

2) Description of Related Art

Access to remote locations by manned or unmanned flight vehicles and ground vehicles may be limited due to geographical, chemical, atmospheric or other constraints. Such conditions may make it difficult to acquire desired data from such locations because it may be difficult for either manned or unmanned vehicles to navigate the approaches to them. To aid in obtaining such data, manned and unmanned flight vehicles and ground vehicles typically use various imaging and sensing devices and systems to obtain and transmit data for purposes such as surveillance, reconnaissance, detecting locations and objects, and imaging such locations and objects.

Known sensing and imaging devices and systems may includes both active systems which generate and transmit various types of radiation and develop guidance signals based on reflections obtained from a location or object, and passive systems which develop guidance signals from radiation generated directly by the object itself. For example, known unmanned vehicles incorporating such known sensing and imaging devices and systems may include unmanned reconnaissance aerial vehicles or drone vehicles. However, for data collection applications requiring low observable or low profile devices, such unmanned vehicles may be limited due to their size and aerodynamic profile.

Moreover, known manned and unmanned vehicles incorporating such known sensing and imaging devices and systems may be limited in their long range capability, fast response time, stability, multiple simultaneous images from different locations, and the ability to obtain and transmit high resolution and accurate images of locations and objects. Further, known manned and unmanned vehicles may not have the capability to dispense simultaneously from one vehicle both a device having surveillance and reconnaissance imaging and sensing capabilities and a separate device having object locator imaging and sensing capabilities.

Accordingly, there is a need in the art for improved imaging and sensing devices, systems and methods for obtaining data on locations and objects that provide advantages over known devices, systems and methods.

SUMMARY

This need for an improved imaging and sensing device, system and methods for obtaining data on locations and objects is satisfied. As discussed in the below detailed description, embodiments of such improved device, system and method may provide significant advantages over existing devices, systems and methods.

In one embodiment there is provided an imaging and sensing assembly. The imaging and sensing assembly comprises a disc shaped aerodynamic member configured to spin and self-position in flight. The imaging and sensing assembly further comprises a plurality of pulsed thrusters positioned on the aerodynamic member. The imaging and sensing assembly further comprises a plurality of imaging and sensing devices positioned along a perimeter of the aerodynamic member. The imaging and sensing assembly further comprises one or more antenna devices positioned on the aerodynamic member and in communication with a first processor device on the aerodynamic member. The first processor device receives data obtained by the plurality of imaging and sensing devices and wirelessly transmits the data to a second processor device not positioned on the aerodynamic member. The imaging and sensing assembly further comprises a power supply powering the imaging and sensing assembly.

In another embodiment there is provided an imaging and sensing assembly dispenser system. The dispenser system comprises a dispenser device having a plurality of storage slots extending from a position near a central portion of the dispenser device to an external surface of the dispenser device. The storage slots are shaped to house one or more imaging and sensing assemblies. Each imaging and sensing assembly comprises a disc shaped aerodynamic member configured to spin and self-position in flight. The imaging and sensing assembly further comprises a plurality of pulsed thrusters positioned on the aerodynamic member. The imaging and sensing assembly further comprises a plurality of imaging and sensing devices positioned along a perimeter of the aerodynamic member. The imaging and sensing assembly further comprises one or more antenna devices positioned on the aerodynamic member and in communication with a first processor device on the aerodynamic member. The first processor device receives data obtained by the plurality of imaging and sensing devices and wirelessly transmits the data to a second processor device not positioned on the aerodynamic member. The imaging and sensing assembly further comprises a power supply powering the imaging and sensing assembly. The dispenser system further comprises a communication system coupled to the dispenser device and configured to communicate data between the dispenser device and the one or more imaging and sensing assemblies. The dispenser system further comprises one or more ejection devices to eject the one or more imaging and sensing assemblies out of the dispenser device.

In another embodiment there is provided a method for imaging, sensing and obtaining data. The method comprises ejecting an imaging and sensing assembly from a dispenser system attached to a structure. The imaging and sensing assembly comprises a disc shaped aerodynamic member configured to spin and self-position in flight. The imaging and sensing assembly further comprises a plurality of pulsed thrusters positioned on the aerodynamic member. The imaging and sensing assembly further comprises a plurality of imaging and sensing devices positioned along a perimeter of the aerodynamic member. The imaging and sensing assembly further comprises one or more antenna devices positioned on the aerodynamic member and in communication with a first processor device on the aerodynamic member. The method further comprises spinning the disc shaped aerodynamic member while in flight. The method further comprises obtaining data from the plurality of imaging and sensing devices.

The method further comprises transmitting the data to a second processor device for processing.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 4:
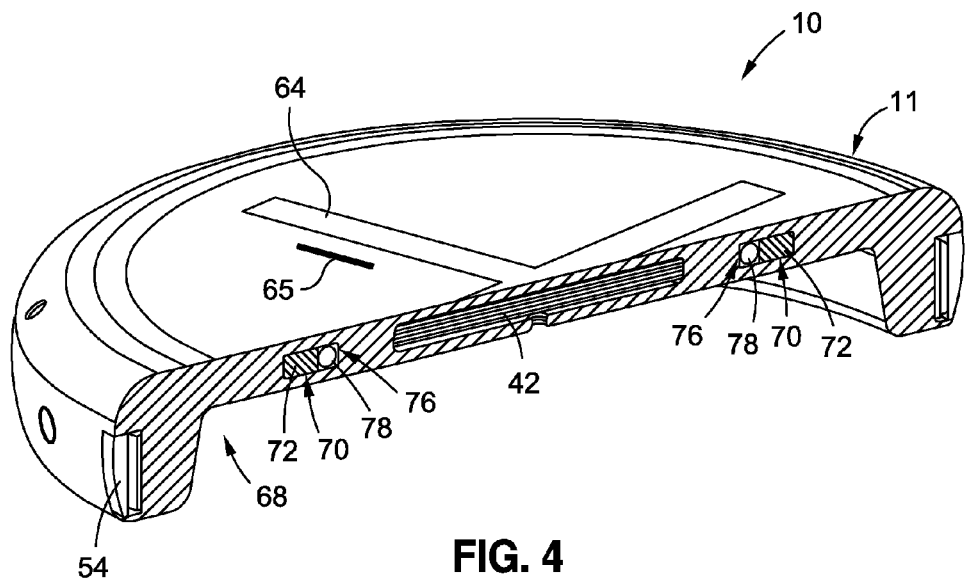
FIG. 4 is an illustration of a cross-sectional perspective view of the imaging and sensing assembly taken along lines 4-4 of FIG. 2.
Figure 5:
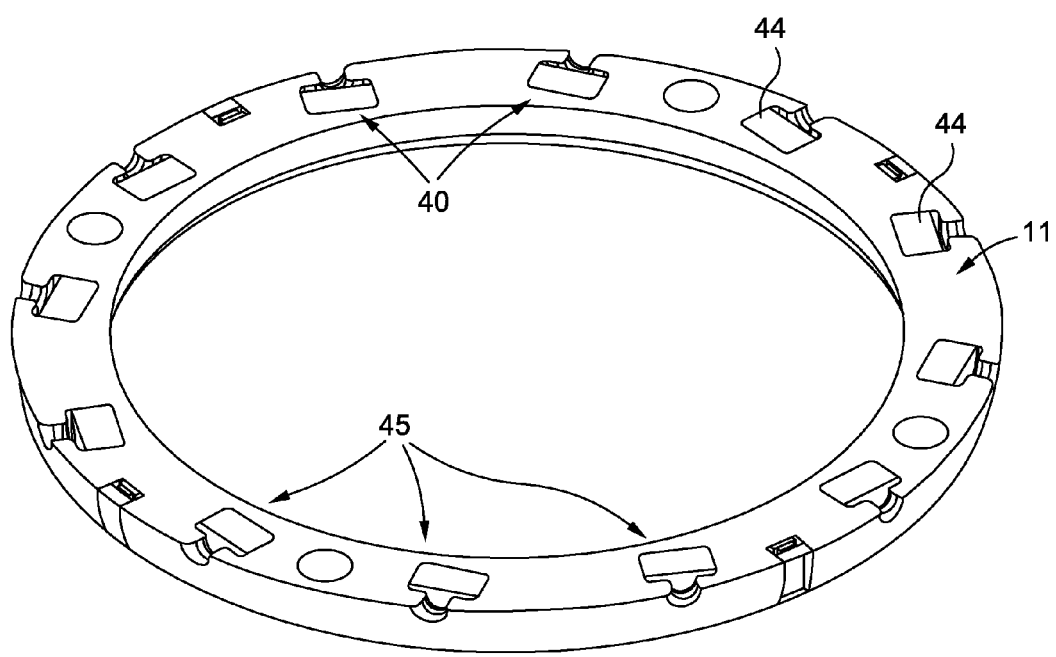
FIG. 5 is an illustration of a top cut-away perspective view of the imaging and sensing assembly of FIG. 1 showing radial thrusters in an offset angle position.
Figure 6:
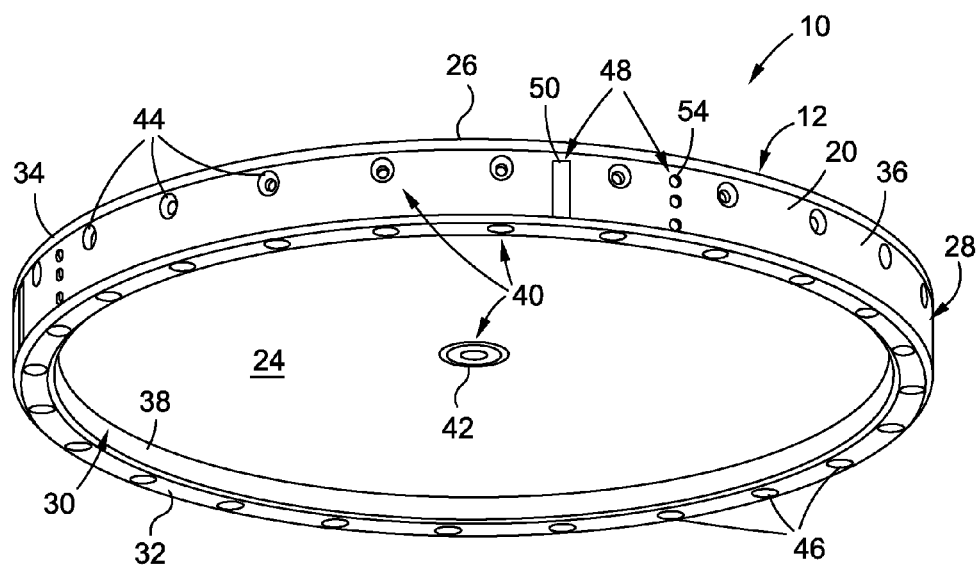
FIG. 6 is an illustration of a bottom perspective view of another one of the embodiments of an imaging and sensing assembly of the disclosure.
Figure 7:
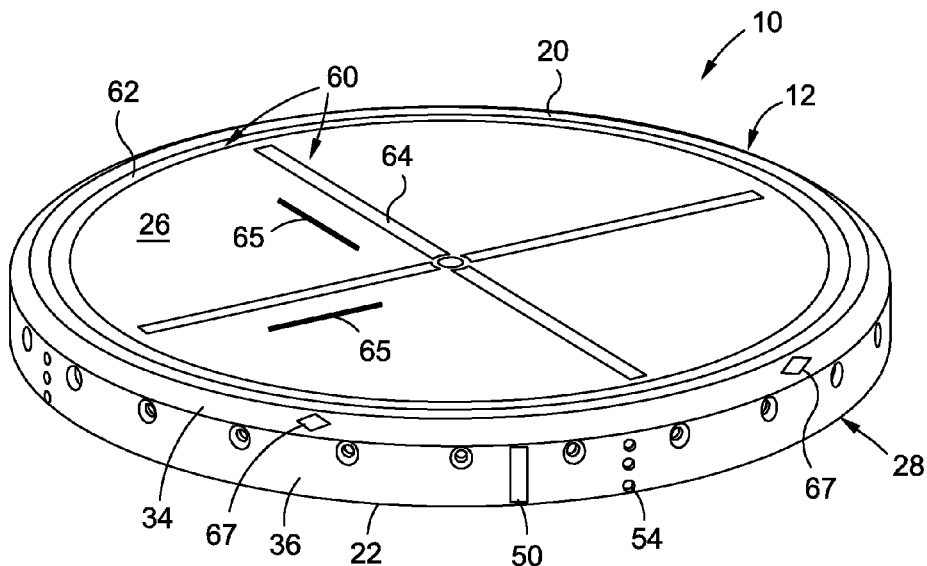
FIG. 7 is an illustration of a top perspective view of the imaging and sensing assembly of FIG. 6.

Now referring to the Figures, in one embodiment of the disclosure, there is provided an imaging and sensing assembly 10 (see FIGS. 1-7). FIGS. 1-5 show one embodiment of the imaging and sensing assembly 10 comprising a first surveillance and reconnaissance imaging and sensing assembly 11. FIGS. 6-7 show another embodiment of the imaging and sensing assembly 10 comprising a second surveillance and reconnaissance imaging and sensing assembly 12.

Figure 1:
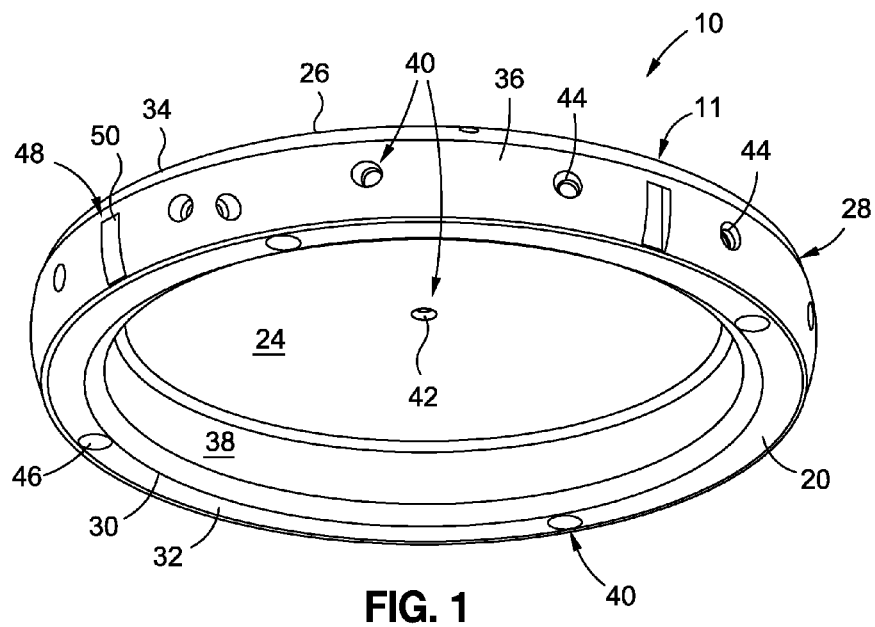
FIG. 1 is an illustration of a bottom perspective view of one of the embodiments of an imaging and sensing assembly of the disclosure.
Figure 2:
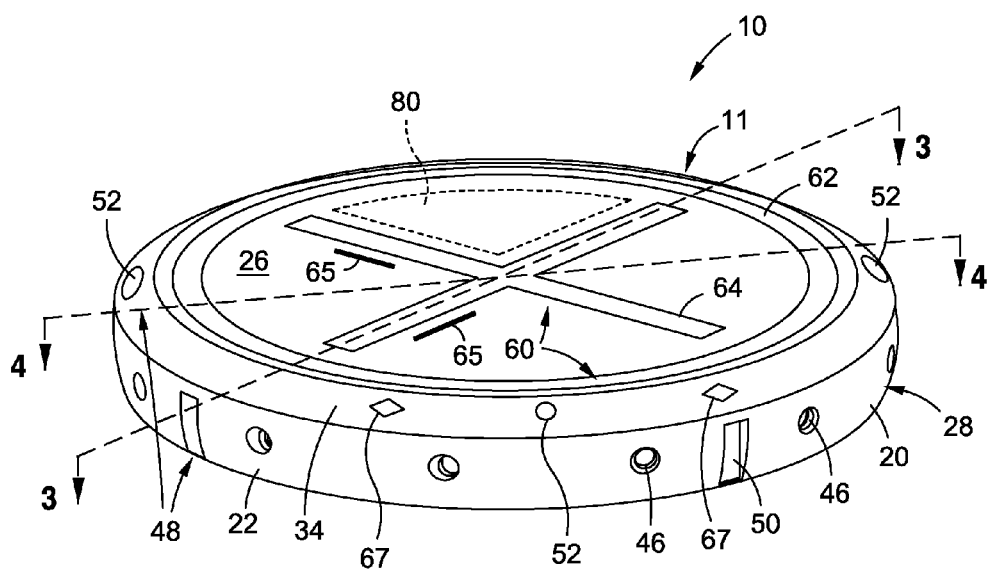
FIG. 2 is an illustration of a top perspective view of the imaging and sensing assembly of FIG. 1.
Figure 3:
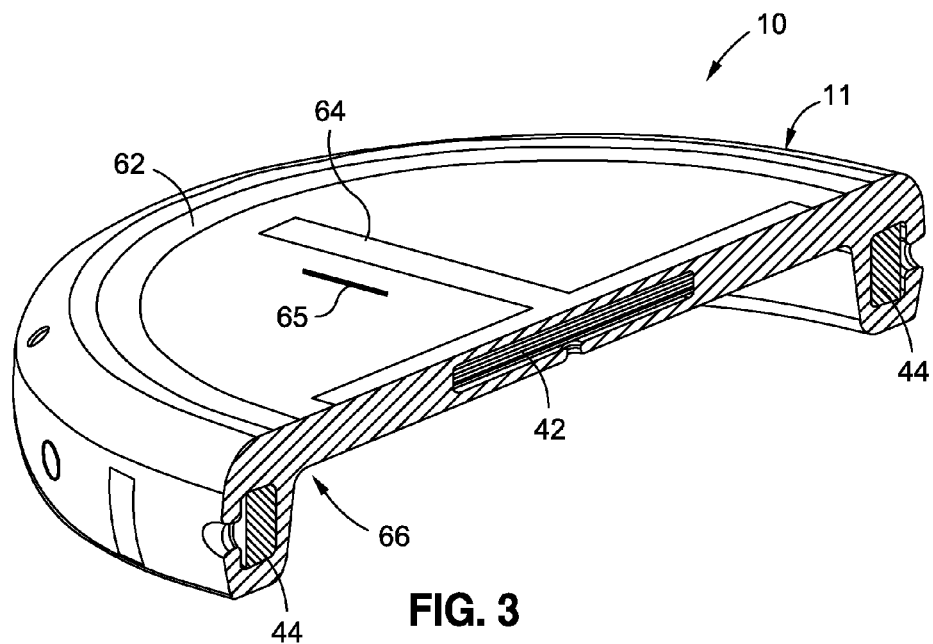
FIG. 3 is an illustration of a cross-sectional perspective view of the imaging and sensing assembly taken along lines 3-3 of FIG. 2.

Referring to the imaging and sensing assembly 10 shown in FIGS. 1-5 and FIGS. 6-7, FIG. 1 is an illustration of a bottom perspective view of the imaging and sensing assembly 10 comprising the first surveillance and reconnaissance imaging and sensing assembly 11. FIG. 2 is an illustration of a top perspective view of the imaging and sensing assembly 10 of FIG. 1. FIG. 3 is an illustration of a cross-sectional perspective view of the imaging and sensing assembly 10 taken along lines 3-3 of FIG. 2. FIG. 4 is an illustration of a cross-sectional perspective view of the imaging and sensing assembly 10 taken along lines 4-4 of FIG. 2. FIG. 5 is an illustration of a top cut-away perspective view of the imaging and sensing assembly 10 of FIG. 1 showing radial thrusters 44 in an offset angle position 45.

FIG. 6 is an illustration of a bottom perspective view of the imaging and sensing assembly 10 comprising the second surveillance and reconnaissance imaging and sensing assembly 12. FIG. 7 is an illustration of a top perspective view of the imaging and sensing assembly 10 of FIG. 6.

The imaging and sensing assembly 10 comprises an aerodynamic member 20 (see FIGS. 1, 6) preferably having a disc shape 22 (see FIGS. 2, 7). The aerodynamic member 20 is configured to spin and self-position in flight. The disc shape 22 is preferably an airfoil in cross-section. The airfoil shape allows the aerodynamic member 20 to fly by generating lift as it moves through the air while rotating. As shown in FIGS. 1, 6, the aerodynamic member 20 has a first side 24, a second side 26, a body portion 28, and a rim portion 30. As further shown in FIGS. 1, 6, the rim portion 30 comprises a first end 32, a second end 34, a perimeter portion 36, and an interior portion 38.

As further shown in FIGS. 1, 6, the imaging and sensing assembly 10 further comprises a plurality of pulsed thrusters 40 positioned on the aerodynamic member 20. The plurality of pulsed thrusters 40 may comprise one or more central thrusters 42 (see FIGS. 1, 6), one or more radial thrusters 44 (see FIGS. 1, 6), one or more torque thrusters 46 (see FIGS. 1,6), a combination thereof, or another suitable pulsed thruster 40. As shown in FIG. 3, the radial thrusters 44 may be embedded in the imaging and sensing assembly 10 at sectional central portion 66.

FIG. 5 is an illustration of a sectional perspective view of one of the embodiments of the imaging and sensing assembly 10 showing radial thrusters 44 at an offset angle position 45. As shown in FIG. 5, the radial thrusters 44 are preferably offset five (5) degrees to fifteen (15) degrees at the offset angle position 45 to sustain spin of the aerodynamic member 20 and to augment horizontal thrust for the aerodynamic member 20 in order to keep the imaging and sensing assembly 10 stabilized while in flight.

As further shown in FIGS. 1, 6, the imaging and sensing assembly 10 further comprises a plurality of imaging and sensing devices 48 positioned along the perimeter portion 36 of the rim portion 30 of the aerodynamic member 20. The plurality of imaging and sensing devices 48 may comprise one dimensional imaging and sensing devices, two dimensional imaging and sensing devices, camera imaging and sensing devices including push broom optics with focal plane arrays, such as push broom optics or cameras with linear focal plane arrays, camera imaging and sensing devices including long term ground surveillance camera imaging and sensing devices, line scan imaging devices including line scan imaging optical cameras, optical and infrared imaging and sensing devices, radar sensing devices, laser scanning devices, a combination thereof, or another suitable imaging and sensing device.

FIGS. 1 and 7 show an optical/IR (infrared) imaging and sensing device 50, in the form of optical/IR sensors, on the perimeter portion 36 of the rim portion 30. FIG. 2 shows a camera imaging and sensing device 52, in the form of a long term ground surveillance camera imaging and sensing device, on the perimeter portion 36 of the rim portion 30. FIG. 4 shows a camera imaging and sensing device 54, such as, for example, in the form of push broom optics with a linear focal plane array at sectional central portion 68. The plurality of imaging and sensing devices 48, such as the optical/IR sensors, or laser scanning may be used to detect proximity of an object 94 (see FIG. 11).

As used herein, an "imaging and sensing device" means a device that converts an optical image into an electronic signal. As used herein, a "line scan imaging device" means a device or system capable of acquiring images from continuous or cylindrical surfaces and made pixel line by pixel line.

For "push broom optics with focal plane arrays", as used herein, "push broom optics" means using push broom cameras or imaging devices to gather a complete spectrum of each point on one spatial line area such that an object is scanned one line or a few lines at a time. To image the whole object, either the object or the camera must move. Push broom optics can be effective for airborne applications as the steady movement of the flight vehicle or aircraft provides the constant scanning of the ground surface. As used herein "focal plane arrays" mean detectors which consist of a linear or two-dimensional matrix of individual elements that are used at the focus of imaging systems, including linear focal plane arrays and area focal plane arrays. Linear focal plane arrays consist of a single line of pixels. Area focal plane arrays consist of rows and columns of pixels. Spectral ranges for the focal plane arrays may comprise visible, infrared (IR) such as near-infrared (NIR), mid-infrared, far-infrared (FIR), ultraviolet (UV), microwave, or another suitable spectral range. Visible light has wavelengths from 400 nm to 750 nm. NIR light has wavelengths from 750 nm to 2.5 μm, mid-infrared light has wavelengths from 2.5 μm to 10 μm, and FIR light has wavelengths from 10 μm to 1 mm. Ultraviolet light or UV light has wavelengths from 10 nm to 400 nm. Focal plane arrays are particularly useful for aerial reconnaissance, aerial mapping, machine vision, measurement applications, and other suitable uses.

As further shown in FIGS. 2, 7, the imaging and sensing assembly 10 further comprises one or more antenna devices 60 positioned on the aerodynamic member 20. Preferably, the one or more antenna devices 60 are positioned on the second side 26 of the aerodynamic member 20. The one or more antenna devices 60 may comprise one or more radio frequency antenna devices, such as, for example, radio frequency proximity fuse antenna devices 62 (see FIGS. 2, 7), radio frequency antenna devices for receiving and transmitting data communications, including, for example, global positioning system (GPS) radio frequency antenna devices 64, or a combination thereof, or another suitable antenna device 60.

The one or more antenna devices 60 are preferably in communication with a first processor device 70 (see FIG. 4) positioned on or in the aerodynamic member 20. Preferably, as shown in FIG. 4, the first processor device 70 may be embedded within the body portion 28 (see FIG. 1) of the aerodynamic member 20. The first processor device 70 may comprise, for example, a microprocessor, a computer device having one or more microprocessor central processing units (CPUs), a microcomputer device, a computer with a guidance, navigation and control (GNC) controller, a combination thereof, or another suitable processor device. The processor device 70 may be configured to receive information and provide control to the plurality of pulsed thrusters 40 to activate and deactivate the plurality of pulsed thrusters 40 in order to reposition the imaging and sensing assembly 10 during flight.

As shown in FIG. 4, the first processor device 70 may comprise a microprocessor computer with a GNC controller 72. The first processor device 70 receives data 84 (see FIG. 15) obtained by the plurality of imaging and sensing devices 48 and wirelessly transmits the data 84 (see FIG. 15) to a second processor device 74 (see FIGS. 11-13). The second processor device 74 may be located in or on a separate flight vehicle 16 (see FIGS. 11-13), such as a helicopter 18 (see FIGS. 11-13 and FIG. 15). Alternatively, the second processor device 74 or a third processor device 75 (see FIG. 15) may be located on or in a structure 14 on the ground, such as a separate ground station 99 (see FIG. 15) or ground vehicle (not shown) for use by a ground user 98 (see FIG. 15), or on or in a separate aircraft or other location configured to house a processor device, such as a computer or microprocessor. Alternatively, a processor communication transmission node 96 (see FIG. 15), such as on a satellite 97 (see FIG. 15), may be used to receive data 82 (see FIG. 15) processed by the first processor device 70 on the imaging and sensing assembly 10 and may process the data 82 with a fourth processor device 77. The processor communication transmission node 96 may then relay data 89 (see FIG. 15) to the helicopter 18 having the second processor device 74 for processing the data 89. In addition, the processor communication transmission node 96 may then relay data 91 (see FIG. 15) to the ground station 99 (see FIG. 15) or ground location having the second processor device 74 or a separate third processor device 75 (see FIG. 15) for processing the data 91.

The second processor device 74, the third processor device 75, and the fourth processor device 77 may comprise, for example, computers such as laptop computers, desktop computers, and notebook computers, a microprocessor, a computer device having one or more microprocessor central processing units (CPUs), a microcomputer device, handheld computer devices such as handheld tablet computers and mobile smartphones, a computer with a guidance, navigation and control (GN&C) controller, a combination thereof, or another suitable processor device.

The data 82, 84, 86 (see FIG. 15) obtained by the plurality of imaging and sensing devices 48 may comprise a plurality of images 92 (see FIG. 15) including video images and high resolution streaming optical/IR (infrared) video images, raw data, radar images, microwave images, a combination thereof, or other suitable data. The data preferably comprises data relating to an object 94 (see FIG. 15), data relating to a location 95 (see FIG. 15) of the object 94, or data relating to a location 95 only. The object 94 may comprise flight vehicles including unmanned and manned air vehicles, ground vehicles, ground structures including building, campsites, ground stations, and other ground structures, flying devices, projectiles, radar towers and other structures having telecommunications devices, transmission devices and/or signal devices, people, birds, chemical materials, nuclear materials, improvised explosive devices (IEDs), and other suitable objects.

As further shown in FIG. 4, the imaging and sensing assembly 10 further comprises a power supply 76 for powering the imaging and sensing assembly 10. The power supply 76 may comprise one or more batteries 78 (see FIG. 4) such as lithium ion batteries, thermal batteries, zinc air batteries, and lithium thionyl chloride batteries. The power supply 76 may also comprise one or more solar panels 80 (see FIG. 2) comprising solar cells or solar modules, where the solar cells or solar modules may comprise wafer-based crystalline silicon cells or thin-film cells based on cadmium telluride or silicon, or another suitable solar cell or solar module material, or high efficiency multi-junction solar cells. The power supply 76 may also comprise fuel cells, an internal combustion engine powered generator system (not shown), or another suitable power supply. As shown in FIG. 2, the first surveillance and reconnaissance imaging and sensing assembly 11 may have additional solar panels 80 mounted on the second side 26 in order to provide long term (months or more) surveillance of areas of interest.

Figure 15:
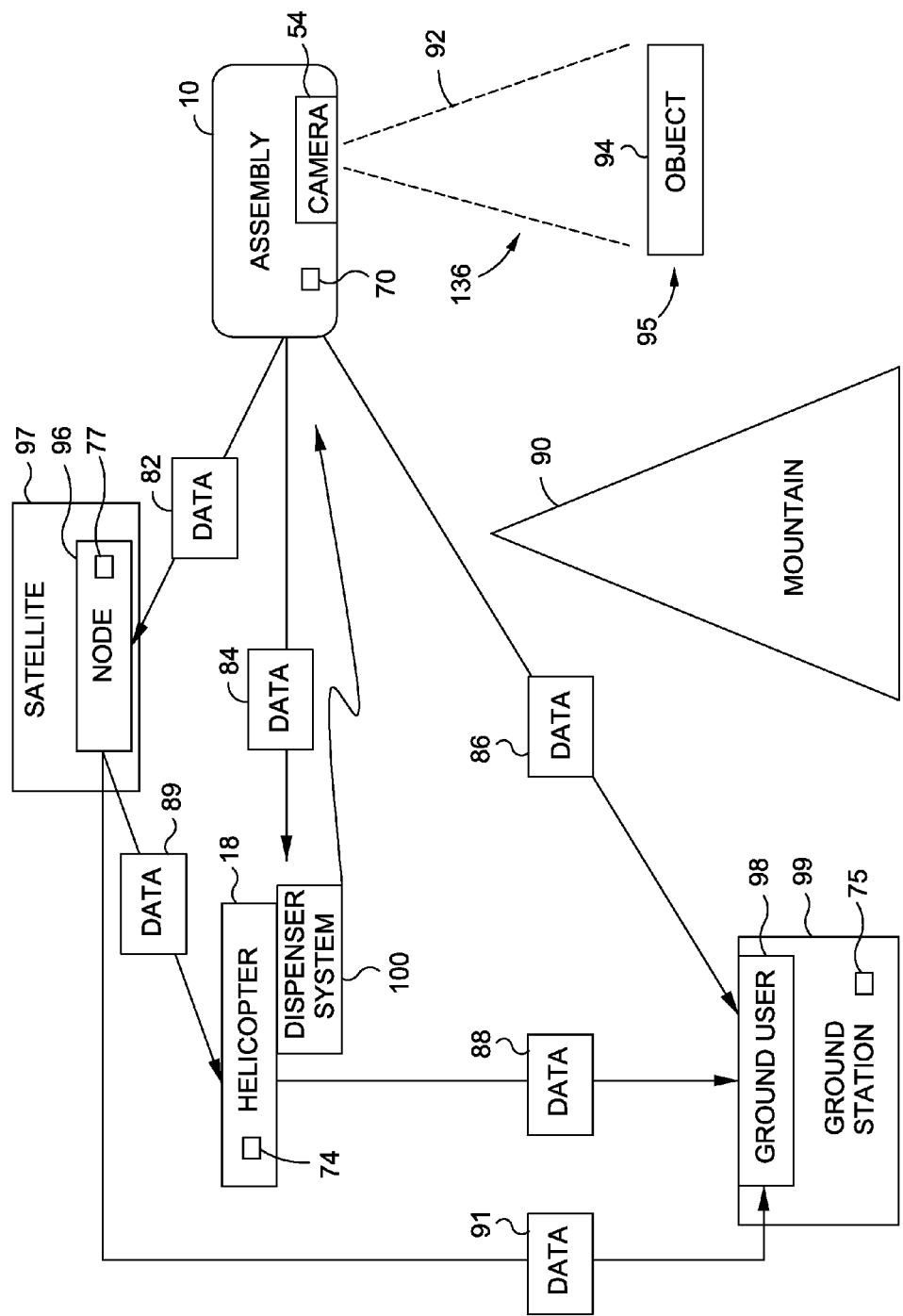
FIG. 15 is an illustration of a schematic diagram showing operation and data transmission by one of the embodiments of an imaging and sensing assembly launched from a dispenser system of the disclosure; and, FIG. 16 is an illustration of a schematic diagram showing another embodiment of a method of the disclosure.

The advantageous features of the imaging and sensing assembly 10, such as the first and second surveillance and reconnaissance imaging and sensing assemblies 11, 12 shown in FIGS. 1-7 may include performing surveillance and reconnaissance to obtain data and other information regarding identified objects 94 (see FIG. 15) and locations 95 (see FIG. 15) that are hidden from direct line of sight to a flight vehicle 16 (see FIG. 11), such as a helicopter 18 (see FIG. 15). The information may be useful to a user to determine specific locations 95 and to determine the type and detail of objects 94 and to gather information about the desired location 95 before the flight vehicle 16 (see FIG. 11) or ground vehicle enters the desired location 95. The imaging and sensing assembly 10 may provide high resolution streaming video which the flight vehicle 16 occupants and crew and/or the ground users 98 in the ground station 99 (see FIG. 15) or ground vehicle can monitor. The flight vehicle 16 occupants or crew and the ground users 98 in the ground station 99 or ground vehicle may also control the imaging and sensing assembly 10 in real time using flat panels (not shown) and joysticks (not shown). The high resolution streaming video may be replayed and analyzed both locally and relayed elsewhere for additional analysis. Since the imaging and sensing assembly 10 may be directed to precise close-up locations, it may deliver more accurate images 92 (see FIG. 15) than a sensor located on the flight vehicle 16 (see FIG. 11), ground station 99 (see FIG. 15) or ground vehicle, or other structure 14 several miles or kilometers away.

Push broom optics, such as push broom optics with a linear focal plane array, may allow for obtaining panoramic views of regions of interest. The disc shaped aerodynamic member 20 (see FIG. 1) may spin at several hundred Hz (hertz). In addition, the imaging and sensing assembly 10 may provide video of objects 94 out of view of a flight vehicle 16 (see FIG. 11) and/or occupants of the flight vehicle 16, since the imaging and sensing assembly 10 is capable of flying over ridge lines and eliminating terrain masking. The imaging and sensing assembly 10 may use push broom optics, such as push broom optics with a linear focal plane array, to maximize the effective pixels for high resolution. By virtue of a high spin rate (>100 Hz (Hertz)), a modest focal plane array with maximum pixels in the vertical dimension may be used to obtain an effectively massive focal plane array. This may be done both in the visible and the IR (infrared) spectrum. In addition, the imaging and sensing assembly 10 may fly to precise locations using a GPS (global positioning system) or laser directed homing. In the event a precise location has been designated beforehand or is being designated in real time with a laser, the imaging and sensing assembly 10 may fly accurately to the location. A GPS receiver may be used for homing as well as determining and relaying accurate locations and object information. A guidance, navigation and control (GNC) controller 72 (see FIG. 4) may include GPS and laser designation to allow remote users to direct the imaging and sensing assembly 10. The imaging and sensing assembly 10 may provide high resolution images of the corridors it flies into as directed.

In addition, the imaging and sensing assembly 10 may be used as a ground based sensor complete with camera imaging and sensing devices 52, including long term ground surveillance camera imaging and sensing devices (see FIG. 2), acoustic sensors 65 (see FIGS. 2, 7), radiation monitors 67 (see FIGS. 2, 7), and other useful detectors such as, for example, chemical, seismic, and magnetic sensors, or other suitable sensors, that may be deployed for long term monitoring. The ground based imaging and sensing assembly 10 may rely on solar panels 80 (see FIG. 2) for long term power enabling its use for months or more.

Further, the advantageous features of the imaging and sensing assembly 10, such as the first and second surveillance and reconnaissance imaging and sensing assemblies 11, 12 shown in FIGS. 1-7, may include having an intrinsic stability due to their gyroscopic stiffness. They may be ejected from the dispenser device 101 (see FIG. 8) with the same tip rotational speed as their translational speed. This can ensure a robust flight against tip-off moments due to wind gusts or changes in moments of inertia when the pulsed thrusters 40 activate. The imaging and sensing assembly 10 is a highly compact flying wing with resultant major structural and aerodynamic advantages over known airplane looking unmanned aerial vehicles (UAVs). The imaging and sensing assembly 10 has lift which allows it extended range. The imaging and sensing assembly 10 has divert capability, or the ability to quickly change directions. This is due to the plurality of pulsed thrusters 40 (see FIGS. 1, 6) at the periphery, such as radial thrusters 44, which may be activated in sequence to provide net impulse to the left or right. Additional central thrusters 42 and torque thrusters 46 may provide velocity either up or down. The central thrusters 42 may be located at the center, and the torque thrusters 46 may be located at the periphery in order to provide torque, thereby causing precession (change in the orientation of the rotational axis of a rotating body). If the torque thrusters 46 are used, they may be pulsed on for only a few degrees of rotation. The induced precession angle may then become angle of attack to generate lift or roll, if needed. In addition, the imaging and sensing assembly 10 may roll in order to focus on an object 94 (see FIG. 11) which may be moving to one side or the other. Roll may be generated with the torque thrusters 46 which may be mounted on the rim portion 30 (see FIGS. 1, 6) of the imaging and sensing assembly 10. Roll is the result of radial thrusters 44 at either the front or rear of the imaging and sensing assembly 10 which then induce precession in the spinning of the imaging and sensing assembly 10.

Figure 8:
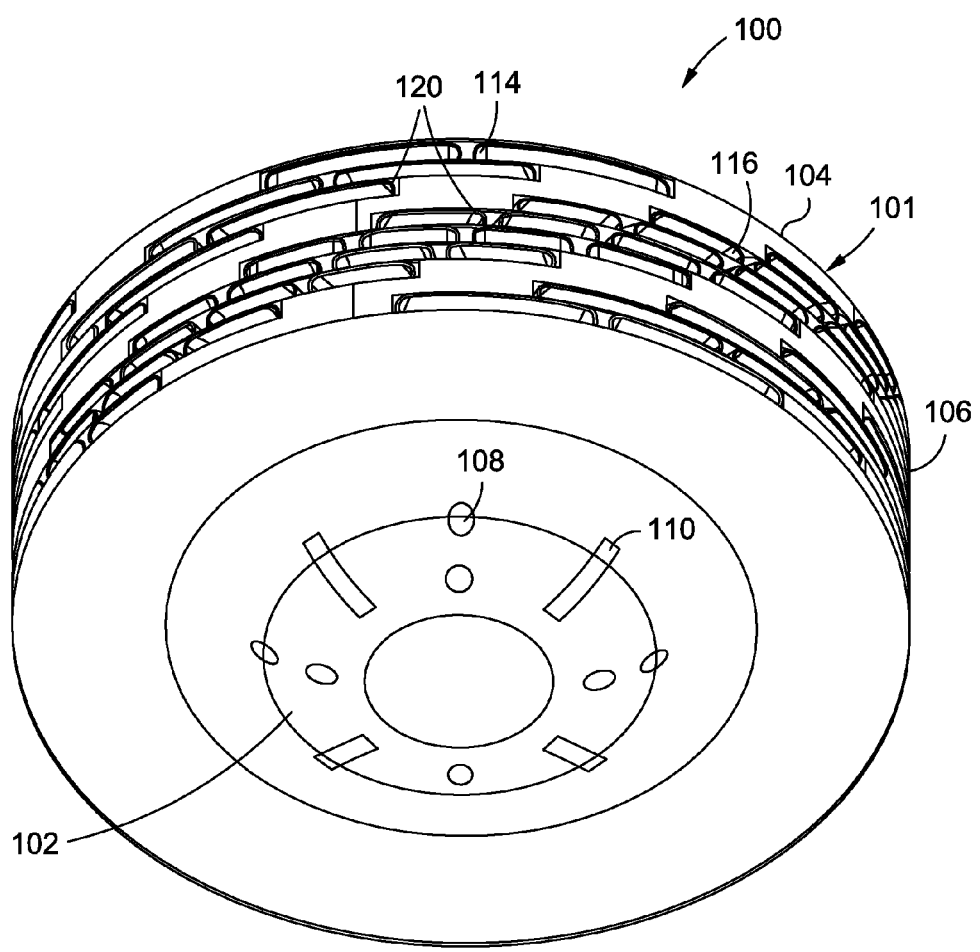
FIG. 8 is an illustration of a bottom perspective view of one of the embodiments of an imaging and sensing assembly dispenser system of the disclosure.
Figure 9:
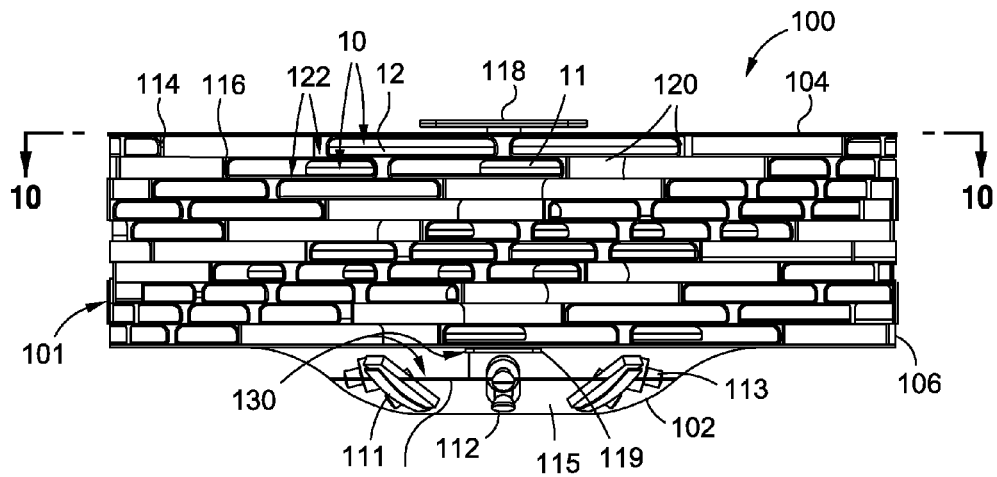
FIG. 9 is an illustration of a front cut-away view of the imaging and sensing assembly dispenser system of FIG. 8.
Figure 10:
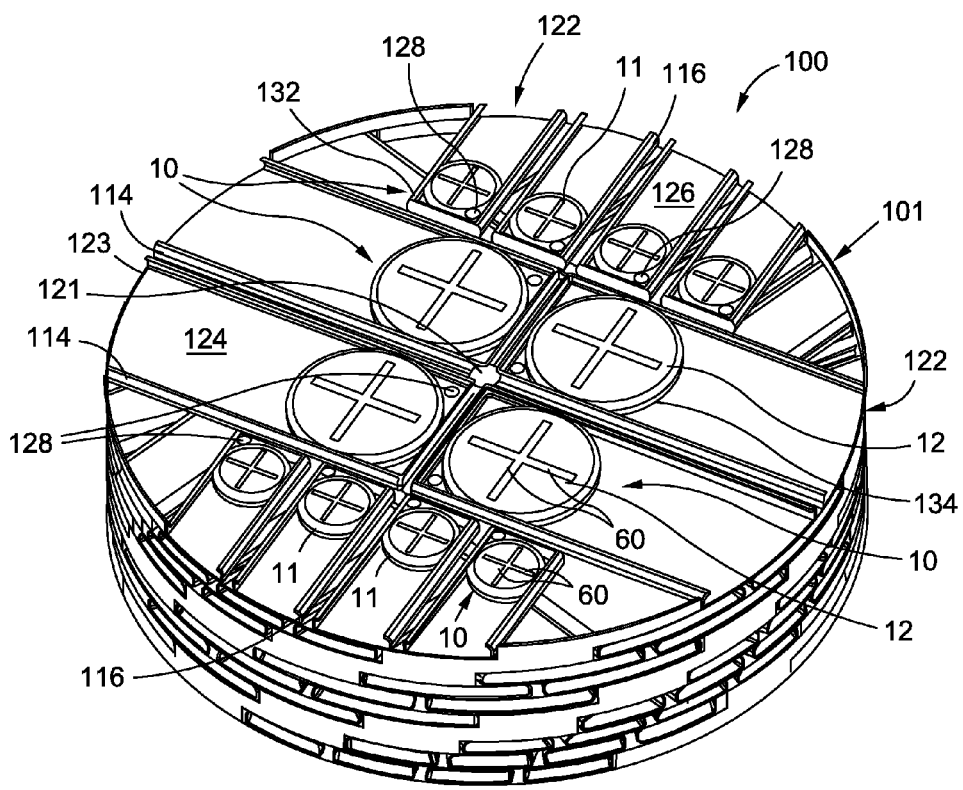
FIG. 10 is an illustration of a cross-sectional perspective view of the imaging and sensing assembly dispenser system taken along lines 10-10 of FIG. 9.

In another embodiment, there is provided an imaging and sensing assembly dispenser system 100. FIG. 8 is an illustration of a bottom perspective view of one of the embodiments of an imaging and sensing assembly dispenser system 100 of the disclosure. FIG. 9 is an illustration of a front cut-away view of the imaging and sensing assembly dispenser system 100 of FIG. 8. FIG. 10 is an illustration of a cross-sectional view of the imaging and sensing assembly dispenser system 100 taken along lines 10-10 of FIG. 9. As shown in FIG. 8, the dispenser system 100 comprises a dispenser device 101. As further shown in FIG. 8, the dispenser device 101 has a first end 102, a second end 104 and a body portion 106. As further shown in FIG. 8, the first end 102 comprises one or more radar windows 108 and one or more optical/IR (infrared) windows 110. As shown in FIG. 9, the first end 102 has an interior housing portion 115 that houses one or more sensor devices 111 such as optical/IR (infrared) sensor devices, one or more laser illuminator or designator devices 112, one or more radar sensor devices 113, and a communication system 130 comprising one or more radio frequency (RF) antenna devices 117, such as RF patch antenna device, and one or more dispenser processor devices 119. The one or more dispenser processor devices 119 may comprise a microprocessor, a computer device having one or more microprocessor central processing units (CPUs), a microcomputer, or another suitable processor device.

Preferably, the dispenser device 101 has an aerodynamic profile providing minimum or low drag. The dispenser device 101 may have a height of approximately 18 inches and a diameter of about 48 inches. However, the dispenser device 101 may be shaped or reduced in size by trading the number of first ejection barrels 124 (see FIG. 10) and second ejection barrels 126 (see FIG. 10) or dimensions of the aerodynamic members 20. A low observable dispenser device 101 may be accomplished by a combination of faceting or geometric shaping, as well as the use of radar absorbing materials (RAM).

As further shown in FIG. 9 and FIGS. 11-13, the dispenser system 100 further comprises a mounting flange 118 at the second end 104 of the dispenser device 101. The mounting flange 118 is designed for mounting the dispenser system 100 to a structure 14 (see FIG. 11), such as a flight vehicle 16 (see FIG. 11), i.e., helicopter 18 (see FIG. 11), or other flight vehicle or aircraft, or another structure.

As further shown in FIGS. 8-10, the body portion 106 of the dispenser device 101 comprises a plurality of first storage slots 114 and second storage slots 116 shaped to house one or more imaging and sensing assemblies 10. As shown in FIGS. 8-9, the first storage slots 114 are preferably larger in size and designed to house an imaging and sensing assembly 10 of a larger size. However, one embodiment of the body portion 106 may include storage slots that are of equal size. The second storage slots 116 are preferably smaller than the first storage slots 114 and are designed to house a smaller imaging and sensing assembly 10. The size of the imaging and sensing assembly 10 may be different as to the load and equipment that is carried to accomplish a stated mission. For example, a larger payload containing multiple types of sensors or to deploy to a further object location may require larger propulsive capability and therefore more fuel volumes than, for example, an imaging and sensing assembly 10 that may only have cameras or optics. The plurality of first storage slots 114 and second storage slots 116 may preferably have staggered layers 120 (see FIGS. 8-9). As shown in FIG. 10, the first storage slots 114 and the second storage slots 116 extend from a position near a central portion 121 (see FIG. 10) of the dispenser device 101 to an external surface 123 (see FIG. 10) of the dispenser device 101. The first and second storage slots 114, 116, are preferably shaped to house one or more imaging and sensing assemblies 10.

The dispenser system 100 may further include a communication system 130 (see FIG. 9) positioned on or within the dispenser device 101 in order to communicate data between the dispenser device 101 and the one or more imaging and sensing assemblies 10. The communication system 130 positioned on the one or more imaging and sensing assemblies 10 preferably comprises one or more radio frequency (RF) antenna devices 117, such as RF patch antenna devices, and one or more dispenser processor devices 119. The dispenser processor device 119 may process data or information received from the first processor device 70 receiving data obtained by the plurality of imaging and sensing devices 48 and may wirelessly transmit the data to a second processor device 74 (see FIG. 11) not positioned on the aerodynamic member 20.

The dispenser system 100 further comprises one or more ejection devices 122 (see FIGS. 9-10) to eject the one or more imaging and sensing assemblies 10 out of the dispenser device 101. The ejection devices 122 may comprise a first ejection barrel 124 (see FIG. 10) configured for disposal in the first storage slot 114 and a second ejection barrel 126 (see FIG. 10) configured for disposal in the second storage slot 116. As shown in FIG. 10, the first ejection barrels 124 may be preferably larger in size and designed to house a larger imaging and sensing assembly 10 (for example, greater than 10 inches in diameter). The first ejection barrels 124 and the second ejection barrels 126 may be inclined up and down.

The ejection devices 122 may further comprise ejection charges 128 (see FIG. 10). The ejection devices 122 may further comprise one or more rack and pinion devices 132 (see FIG. 10) or one or more belt devices 134 (see FIG. 10) for spinning the imaging and sensing assembly 10 when it is ejected. The first and second ejection barrels 124, 126 may spin the imaging and sensing assemblies 10 with one or more rack and pinion devices 132, where one side of each of the first and second ejection barrels 124,126 has modest teeth (not shown) which engage small grooves (not shown) in the imaging and sensing assemblies 10. Alternatively, the first and second ejection barrels 124, 126 may spin the imaging and sensing assemblies 10 with one or more belt devices 134 wrapped around the aerodynamic member 20 and fastened near the breech inside each of the first and second ejection barrels 124,126. Friction holds the one or more belt devices 134 to the aerodynamic member 20 during launch or ejection and then it unwraps and is left attached to the first ejection barrel 124 or the second ejection barrel 126. A third method to spin the imaging and sensing assemblies 10 may be to ignite perimeter rockets having an azimuthal thrust during launch.

The dispenser system 100 may have a modest spin rate that may be active only when needed. By virtue of the large number of first and second ejection barrels 124, 126 and their staggered layers 120 and locations, one can spin the dispenser system 100 at a mere 5 Hz (hertz) and yet have a maximum slew delay of only 10 ms (milliseconds). This spin rate may be increased in the event one requires a less than 10 ms (milliseconds) slew delay ("slew" is the rotation of an object about an axis).

The dispenser system 100 may eject the imaging and sensing assemblies 10 at velocities of 100 m/s (meters per second) or more, using the rectangular first ejection barrels 124 and second ejection barrels 126 and suitable propellant material, such as gunpowder. The use of the rectangular first ejection barrels 124 and second ejection barrels 126 may allow for accurate aiming as well as efficient and simple propulsion. For example, at a velocity of 100 m/s, less than 1% of the flight mass worth of smokeless propellant may be needed As discussed in detail above, each imaging and sensing assembly 10 stored or housed in the dispenser system 100 comprises a disc shaped aerodynamic member 20 configured to spin and self-position in flight. The imaging and sensing assembly 10 further comprises a plurality of pulsed thrusters 40 positioned on the aerodynamic member 20. The imaging and sensing assembly 10 further comprises a plurality of imaging and sensing devices 48 positioned along a perimeter portion 36 of the aerodynamic member 20. The imaging and sensing assembly 10 further comprises one or more antenna devices 60 positioned on the aerodynamic member 20 and in communication with a first processor device 70 on the aerodynamic member 20. The first processor device 70 receives data obtained by the plurality of imaging and sensing devices 48 and wirelessly transmits the data to a second processor device 74 (see FIG. 11) not positioned on the aerodynamic member 20. The imaging and sensing assembly 10 further comprises a power supply 76 for powering the imaging and sensing assembly 10.

In one advantageous embodiment, the dispenser system 100 shown in FIGS. 8-10 may include multiple first ejection barrels 124 and second ejection barrels 126 pointing in twenty (20) or more different directions, and spaced apart, such as about 18 degrees apart. This helps to insure that many or all directions may be covered. Since the first ejection barrels 124 and the second ejection barrels 126 may be independently activated, the dispenser system 100 may allow a user to send multiple imaging and sensing assemblies 10 to a single object 94 (see FIG. 11).

Figure 11:
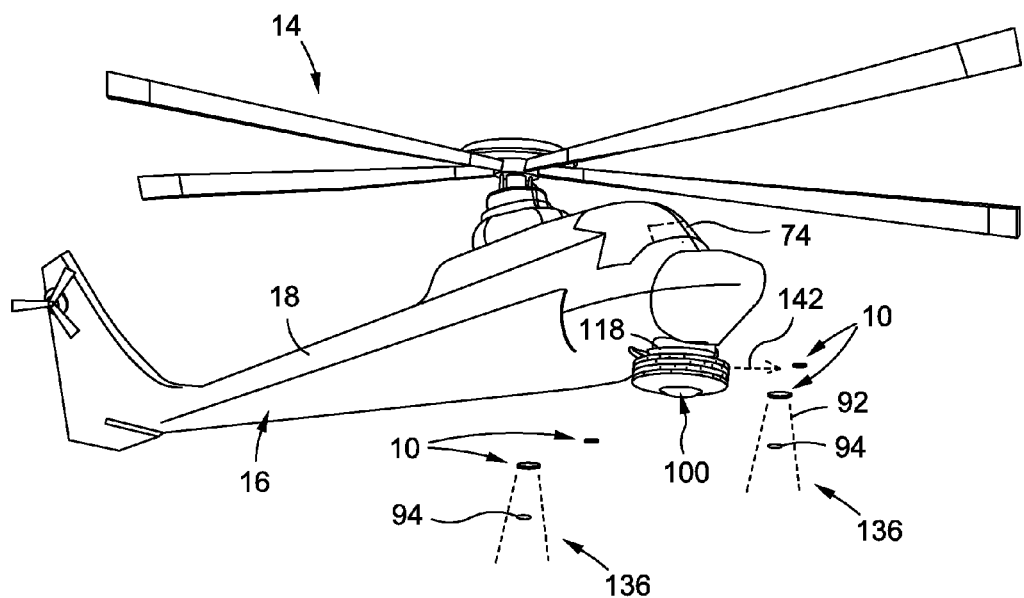
FIG. 11 is an illustration of a front perspective view of a flight vehicle incorporating one of the embodiments of an imaging and sensing assembly dispenser system showing a first object position by embodiments of an imaging and sensing assembly of the disclosure.

FIG. 11 is an illustration of a front perspective view of a flight vehicle 16 incorporating one of the embodiments of the imaging and sensing assembly dispenser system 100 showing a first object position 136 by embodiments of the imaging and sensing assembly 10. FIG. 11 shows exemplary imaging and sensing assemblies 10 being ejected or launched via an ejection path 142 from the dispenser system 100 toward an object 94 and then positioning itself in the first object position 136 over the object 94 in order to take an image 92 of the object 94.

Figure 12:
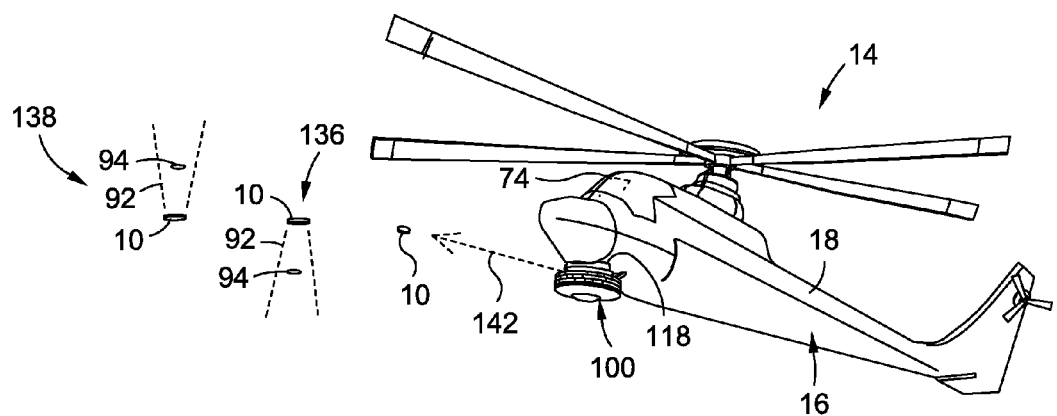
FIG. 12 is an illustration of a front perspective view of the flight vehicle with the imaging and sensing assembly dispenser system of FIG. 11 showing a first object position and a second object position by embodiments of an imaging and sensing assembly of the disclosure.

FIG. 12 is an illustration of a front perspective view of the flight vehicle 16 with the imaging and sensing assembly dispenser system 100 of FIG. 11 showing a first object position 136 and a second object position 138 by embodiments of the imaging and sensing assembly 10 of the disclosure. FIG. 12 shows exemplary imaging and sensing assemblies 10 being ejected or launched via ejection path 142 from the dispenser system 100 toward an object 94 and then positioning itself in the first object position 136 over the object 94 in order to take an image 92 of the object 94 or positioning itself in the second object position 138 under the object 94 in order to take an image 92 of the object 94.

Figure 13:
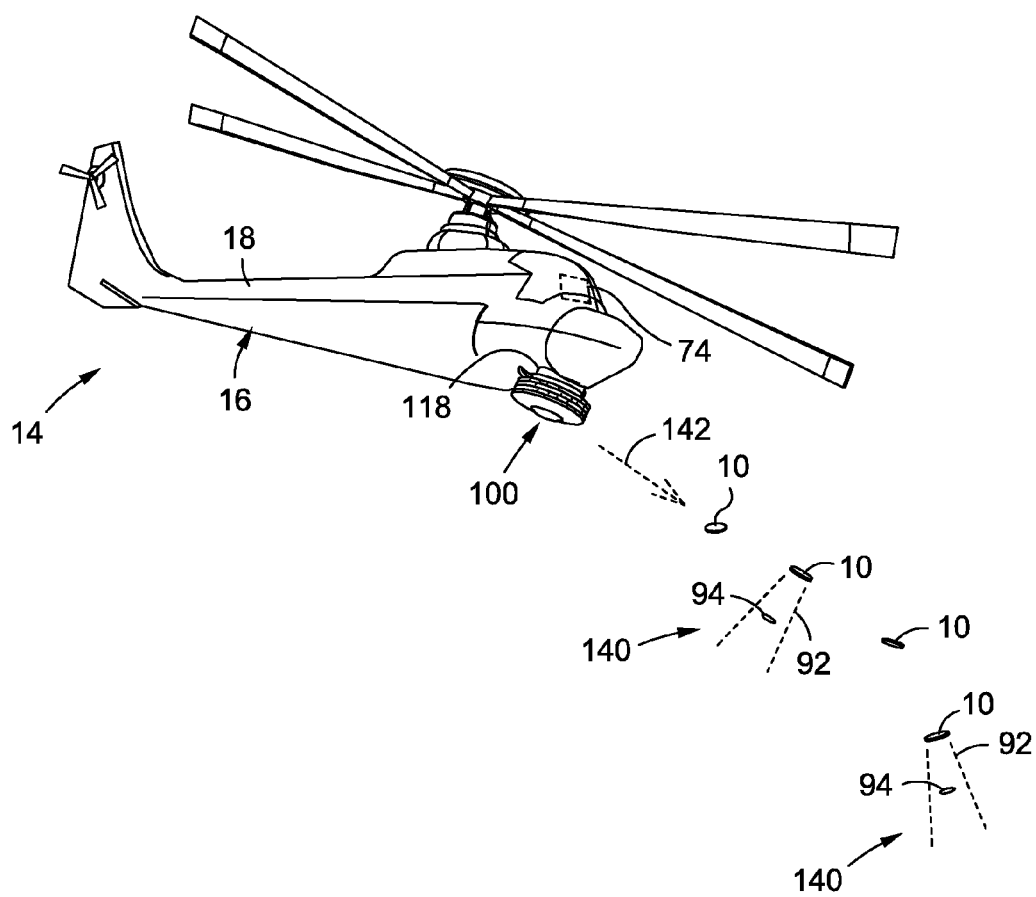
FIG. 13 is an illustration of a front perspective view of the flight vehicle with the imaging and sensing assembly dispenser system of FIG. 11 showing a third object position by embodiments of an imaging and sensing assembly of the disclosure.

FIG. 13 is an illustration of a front perspective view of the flight vehicle 16 with the imaging and sensing assembly dispenser system 100 of FIG. 11 showing a third object position 140 by embodiments of the imaging and sensing assembly 10 of the disclosure. FIG. 13 shows exemplary imaging and sensing assemblies 10 being ejected or launched via ejection path 142 from the dispenser system 100 toward an object 94 and then positioning itself in the third object position 140 at an angle over the object 94 in order to take an image 92 of the object 94.

Figure 14:
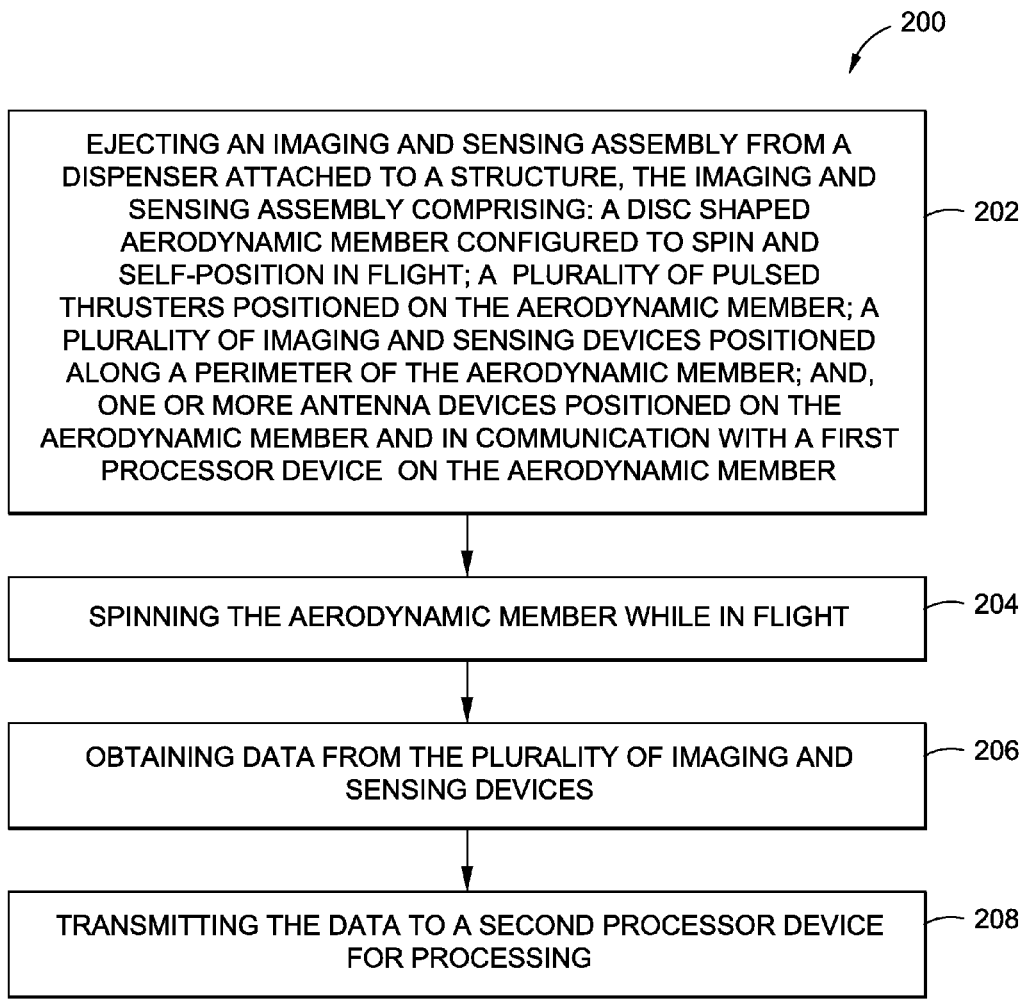
FIG. 14 is an illustration of a flow diagram showing one of the embodiments of a method of the disclosure.

In another embodiment, there is provided a method 200 for imaging, sensing and obtaining data 82, 84, 86, 88, 89, 91 (see FIG. 15). FIG. 14 is an illustration of a flow diagram showing an embodiment of the method 200 of the disclosure. As shown in FIG. 14, the method 200 comprises step 202 of ejecting an imaging and sensing assembly 10 (see FIGS. 1, 6) from a dispenser system 100 (see FIG. 8) attached to a structure 14 (see FIGS. 11-13), such as ejecting from a dispenser device 101 (see FIG. 11) of the dispenser system 100. The imaging and sensing assembly 10, as discussed in detail above, comprises a disc shaped aerodynamic member 20 (see FIGS. 1, 6) configured to spin and self-position in flight. The imaging and sensing assembly 10 further comprises a plurality of pulsed thrusters 40 (see FIGS. 1, 6) positioned on the aerodynamic member 20. The imaging and sensing assembly 10 further comprises a plurality of imaging and sensing devices 48 (see FIGS. 1, 6) positioned along a perimeter portion 36 (see FIGS. 1, 6) of the rim portion 30 of the aerodynamic member 20. The imaging and sensing assembly 10 further comprises one or more antenna devices 60 (see FIGS. 2, 7) positioned on the aerodynamic member 20 and in communication with a first processor device 70 (see FIG. 4) on the aerodynamic member 20. The imaging and sensing assembly 10 further comprises a power supply 76 (see FIG. 4), as discussed above, to power the imaging and sensing assembly 10.

As further shown in FIG. 14, the method 200 further comprises step 204 of spinning the disc shaped aerodynamic member 20 while in flight. As further shown in FIG. 14, the method 200 further comprises step 206 of obtaining data 82, 84, 86 (see FIG. 15) from the plurality of imaging and sensing devices 48. The step 206 of obtaining data 82, 84, 86 (see FIG. 15) from the plurality of imaging and sensing devices 48 may further comprise obtaining a plurality of images 92 (see FIGS. 14-16) via one or more camera imaging and sensing devices 54, such as, for example, push broom optics with a linear focal plane array (see FIG. 4). The linear focal plane array may comprise a visible focal plane array and/or an infrared focal plane array. The method 200 may further comprise the step of using a global positioning system (GPS) radio frequency antenna device 64 (see FIGS. 2, 7) to guide the imaging and sensing assembly 10 to a precise location 95 (see FIG. 15). In an optional example, the method 200 may include using global positioning system (GPS) radio frequency antenna devices 64 (see FIGS. 2, 7) to guide the imaging and sensing assembly 10 to a precise location 95 prior to obtaining data 82, 84, 86 (see FIG. 15) from the plurality of imaging and sensing devices 48 (step 206).

As further shown in FIG. 14, the method 200 further comprises step 208 of transmitting the data 84 (see FIG. 15) to a second processor device 74 (see FIG. 15) for processing. The step 208 of transmitting the data 84 to the second processor device 74 may further comprise delivering high resolution streaming optical/IR (infrared) video images 92 (see FIG. 15) to a second processor device 74 (see FIG. 15). In an optional example, the method 200 may further include transmitting data which includes high resolution streaming optical/IR (infrared) video images of an object 94 (see FIG. 15) that is in a location 95 that is out of view of one or more occupants in a structure 14, such as a flight vehicle 16, for example, a helicopter 18 (see FIG. 15), and/or out of view of the structure 14, such as the flight vehicle 16, for example, the helicopter 18, such as being out of view behind a mountain 90 (see FIG. 15).

The method 200 may further comprise prior to step 202 of ejecting the imaging and sensing assembly 10 from the dispenser system 100, such as from the dispenser device 101 of the dispenser system 100, the step of attaching the dispenser system 100 and dispenser device 101 to a flight vehicle 16 (see FIGS. 11-13) such as a helicopter 18 (see FIGS. 11-13), and housing the second processor device 74 in the flight vehicle 16.

FIG. 15 is an illustration of a schematic diagram showing operation and data transmission by one of the embodiments of an imaging and sensing assembly 10 ejected or launched from a dispenser system 100. In operation, the dispenser system 100 may be mounted onto a structure 14 (see FIG. 11). The structure 14 may comprise a flight vehicle 16 (see FIG. 11), such as a helicopter 18 (see FIGS. 11, 15) or aircraft. The structure 14 may further comprise a vessel, a ground vehicle, a stationary structure, or another suitable structure. The dispenser system 100 may have a mounting flange 118 (see FIG. 11) for attachment to the structure 14, such as the helicopter 18. The imaging and sensing assemblies 10 may be loaded or may have already been loaded into the dispenser system 100 when the dispenser system 100 is mounted to the structure 14, such as the helicopter 18. An electric motor (not shown) in the dispenser system 100 may be activated and cause the body portion 106 (see FIG. 8) of the dispenser device 101 (see FIG. 8) to rotate/spin with respect to the mounting flange 118.

As an object 94 (see FIG. 15) or a location 95 (see FIG. 15) is approached, the dispenser system 100 may be turned on. Turning on the dispenser system 100 may include activating or providing power to the various sensor devices within one of the imaging and sensing assemblies 10 (e.g., imaging and sensing devices 48 (see FIG. 1)) and/or within the dispenser system 100 (e.g., sensor devices 111 (see FIG. 9)). Turning on the dispenser system 100 may also include rotating the dispenser system 100 (see FIG. 8) and the dispenser device 101 (see FIG. 8) of the dispenser system 100. The imaging and sensing assembly 10 and/or the dispenser system 100 may use the sensor devices to determine a location 95 or detect an object 94, including locations 95 or objects 94 out of view of the helicopter 18, such as behind a mountain 90 (see FIG. 15), or other type of terrain.

At a predetermined range from the object 94, multiple imaging and sensing assemblies 10 may be ejected or launched toward the object 94 and/or location 95. The imaging and sensing assemblies 10 may be autonomously directed to the object 94 and/or location 95 or it may be controlled by a human user using visual monitors that are configured to show images 92 (see FIG. 15) retrieved by the imaging and sensing assembly 10 and joy sticks that may be configured to control the plurality of pulsed thrusters 40 on the imaging and sensing assembly 10. As the video from the imaging and sensing assembly 10 is observed, new locations and objects may be identified.

As shown in FIG. 15, the imaging and sensing assembly 10 may be ejected or launched toward an object 94 at a location 95 from the dispenser system 100 attached to the helicopter 18. The imaging and sensing assembly 10 images and senses the object 94 with one or more of the plurality of imaging and sensing devices 48 (see FIGS. 1, 6), such as a camera imaging and sensing device 54, for example, in the form of push broom optics with a linear focal plane array. As shown in FIG. 15, the imaging and sensing assembly 10 uses the camera imaging and sensing device 54 to take an image 92 of the object 94 and/or location 95 and uses a first processor device 70, such as a computer or microprocessor, located on the imaging and sensing assembly 10 to process the image 92 of the object 94 and/or location 95. The imaging and sensing assembly 10 may then communicate or transmit data 84 about the image 92 or location 95 back to the helicopter 18 for processing by a second processor device 74, such as a computer, housed in the helicopter 18. As shown in FIG. 15, the imaging and sensing assembly 10 may further communicate or transmit data 86 to a ground user 98 at a ground station 99 for processing by a third processor device 75, such as a computer or microprocessor device. As further shown in FIG. 15, the imaging and sensing assembly 10 may further communicate or transmit data 82 to a processor communication transmission node 96 in a satellite 97, for example, for processing by a fourth processor device 77, such as a computer or microprocessor. As further shown in FIG. 15, the processor communication transmission node 96 (see FIG. 15) may relay data 89 to the helicopter 18 having the second processor device 74 for processing the data 89, and/or may relay data 91 to the ground station 99 or ground location having a third processor device 75 for processing the data. As further shown in FIG. 15, the helicopter 18 may also transmit data 88 received and processed by the second processor device 74 to the ground user 98 at the ground station 99.

Figure 16:
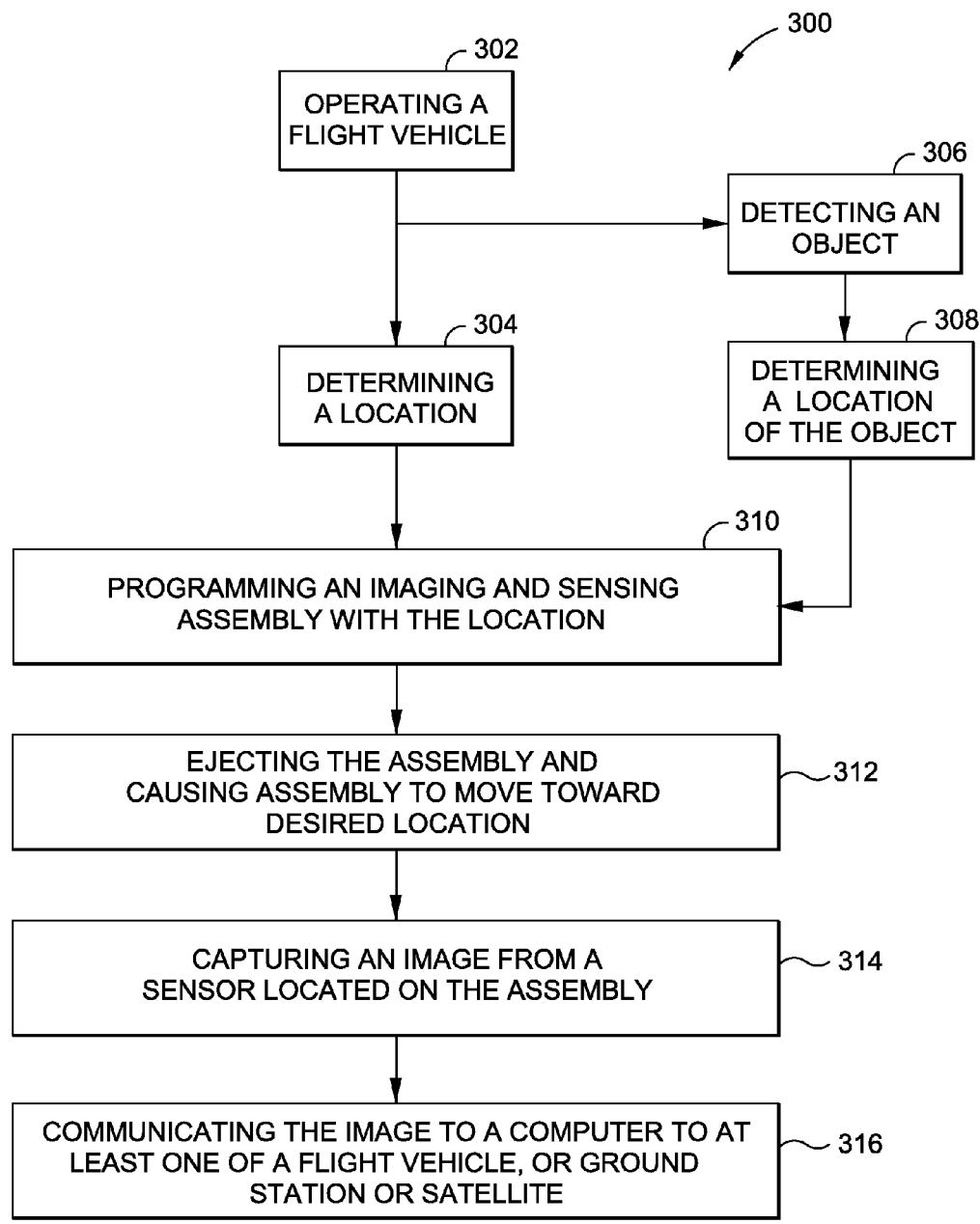

FIG. 16 is an illustration of a schematic diagram showing another embodiment of a method 300 for operation and control of an imaging and sensing assembly 10. The method 300 comprises step 302 of operating a flight vehicle 16 (see FIG. 11), such as a helicopter 18 (see FIG. 11), an aircraft, or another flight vehicle 16, where the flight vehicle 16 has a dispenser system 100 (see FIG. 8) mounted to the flight vehicle 16. The dispenser system 100 is preferably loaded with a plurality of imaging and sensing assemblies 10 (see FIGS. 1-7), as discussed in detail above. The dispenser system 100 comprises a dispenser device 101 (see FIG. 8) having an interior housing portion 115 (see FIG. 9) that houses one or more sensor devices 111 (see FIG. 9) such as optical/IR (infrared) sensor devices (see FIG. 9), one or more laser illuminator or designator devices 112 (see FIG. 9), one or more radar sensor devices 113 (see FIG. 9), and a communication system 130 (see FIG. 9) comprising one or more radio frequency (RF) antenna devices 117 (see FIG. 9), such as RF patch antenna device, and one or more dispenser processor devices 119 (see FIG. 9).

As shown in FIG. 16, the method 300 further comprises step 304 of determining a location for surveillance or reconnaissance using the one or more sensor devices 111 (see FIG. 9) such as the optical/IR (infrared) sensor devices (see FIG. 9), the one or more laser illuminator or designator devices 112 (see FIG. 9), and/or the one or more radar sensor devices 113 (see FIG. 9). As further shown in FIG. 16, alternatively, the method 300 further comprises step 306 of detecting an object (see FIG. 15) using the one or more sensor devices 111 (see FIG. 9) such as the optical/IR (infrared) sensor devices (see FIG. 9), the one or more laser illuminator or designator devices 112 (see FIG. 9), and/or the one or more radar sensor devices 113 (see FIG. 9), and further comprises step 308 of determining a location 95 (see FIG. 15) of the object 94 (see FIG. 15) using the one or more sensor devices 111 (see FIG. 9) such as the optical/IR (infrared) sensor devices (see FIG. 9), the one or more laser illuminator or designator devices 112 (see FIG. 9), and/or the one or more radar sensor devices 113 (see FIG. 9).

The method 300 further comprises after step 304 of determining a location or after steps 306 of detecting the object 94 and determining the location 95, the step 310 of programming an imaging and sensing assembly 10 with the location 95, such as the location 95 of the object 94, using the communication system 130 (see FIG. 9), one or more radio frequency (RF) antenna devices 117 (see FIG. 9), such as RF patch antenna device, and one or more dispenser processor devices 119 (see FIG. 9). The communication system 130 communicates the location 95 of the object 95 to the imaging and sensing assembly 10.

The method 300 further comprises step 312 of ejecting one or more imaging and sensing assemblies 10 via the first and second ejection barrels 124, 126 (see FIG. 10) from the dispenser device 101 of the dispenser system 100 and causing the imaging and sensing assembly 10 to move toward the desired location 95 or object 94. The first and second ejection barrels 124, 126 cause the imaging and sensing assemblies 10 to spin and take flight out of the dispenser system 100.

The method 300 further comprises step 314 of capturing an image 92 (see FIG. 11) from one or more of the plurality of imaging and sensing devices 48 (see FIGS. 1, 6), such as a sensor, or a camera imaging and sensing device 54 (see FIG.

4), such as, for example, push broom optics with a linear focal plane array. The method 300 may further comprise processing the image 92 with a first processor device 70 (see FIG. 4), such as a computer or microprocessor.

The method 300 further comprises step 316 of communicating the image 92 to a second processor device 74, such as a computer, to at least one of a flight vehicle 16 (see FIG. 11), such as a helicopter 18 (see FIG. 15), or to a third processor device 75 (see FIG. 15) and a ground user 98 (see FIG. 15) at a ground station 99 (see FIG. 15), or to a fourth processor device 77 (see FIG. 15) and a processor communication transmission node 96 (see FIG. 15) in a satellite 97 (see FIG. 15).

In one embodiment the imaging and sensing assembly 10 may be preprogrammed with GPS (global positioning system) location information prior to launch. Once launched, a first processor device 70 within the imaging and sensing assembly 10 may determine the current location of the imaging and sensing assembly 10 relative to the destination GPS coordinates. The first processor device 70 may then activate a plurality of pulsed thrusters 40 (see FIGS. 1, 6) on the imaging and sensing assembly 10 to accelerate the imaging and sensing assembly 10 in a different direction. In an alternative embodiment, the imaging and sensing assembly 10 may be launched without a predetermined location. During flight, the plurality of imaging and sensing devices 48 (see FIGS. 2, 6) on the imaging and sensing assembly 10 may capture information relating to the location of the imaging and sensing assembly 10. That information may be transmitted by one or more antenna devices 60 (see FIG. 1) to a second processor device 74 (see FIG. 15), a third processor device 75 (see FIG. 15), and/or a fourth processor device 77 (see FIG. 15), such as computers, at one or more additional locations. The second processor device 74, third processor device 75, and/or fourth processor device 77, such as computers, may be configured to provide the information in the form of an image 92 (see FIG. 15) or video to a user. The user may then provide control information via the second processor device 74, third processor device 75, and/or fourth processor device 77, such as computers, or a different computer that is configured to transmit the information back to the imaging and sensing assembly 10. The first processor device 70, such as a computer, on the imaging and sensing assembly 10 may then control the plurality of pulsed thrusters 40 based on the information received to redirect the imaging and sensing assembly 10 in flight.

In an alternative embodiment, the imaging and sensing assembly 10 may be launched without a predetermined location. Radar or other sensors located at a location other than the imaging and sensing assembly 10 may track the imaging and sensing assembly 10 during flight. The information received from the radar or sensors may then be transmitted to a computer. The computer may then determine the location of the imaging and sensing assembly 10 and the location 95 of an object 94 for the imaging and sensing assembly 10. The computer may then transmit information to the imaging and sensing assembly 10 where it is received at the antenna. A first processor device 70 on the imaging and sensing assembly 10 may then control the plurality of pulsed thrusters 40 based on the information received to redirect the imaging and sensing assembly 10 in flight.

Disclosed embodiments of the imaging and sensing assembly 10 (see FIGS. 1-7), disclosed embodiments of the imaging and sensing assembly dispenser system 100 (see FIGS. 8-10), and disclosed embodiments of the method 200 (see FIG. 14) and method 300 (see FIG. 16) may provide an efficient and accurate means to obtain and transmit data in real time for purposes of surveillance, reconnaissance, and detecting locations and objects. In addition, the imaging and sensing assembly 10, the dispenser system 100, the method 200, and the method 300 may provide access to remote, difficult to reach locations to obtain, collect, and transmit images and other data Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An imaging and sensing assembly comprising:
   a disc shaped aerodynamic member configured to spin and self-position in flight;
   a plurality of pulsed thrusters positioned on the aerodynamic member;
   a plurality of imaging and sensing devices positioned along a perimeter of the aerodynamic member;
   one or more antenna devices positioned on the aerodynamic member and in communication with a first processor device on the aerodynamic member, the first processor device receiving data obtained by the plurality of imaging and sensing devices and wirelessly transmitting the data to a second processor device not positioned on the aerodynamic member; and,
   a power supply powering the imaging and sensing assembly.

2. The assembly of claim 1 wherein the assembly comprises a surveillance and reconnaissance imaging and sensing assembly.

3. The assembly of claim 1 wherein the plurality of pulsed thrusters is selected from a group consisting of central thrusters, radial thrusters, torque thrusters, and a combination thereof.

4. The assembly of claim 1 wherein the plurality of imaging and sensing devices is selected from a group consisting of one dimensional imaging and sensing devices, two dimensional imaging and sensing devices, camera imaging and sensing devices including push broom optics with focal plane arrays camera imaging and sensing devices and long term ground surveillance camera imaging and sensing devices, line scan imaging devices including line scan imaging optical cameras, optical and infrared imaging and sensing devices, radar sensing devices, laser scanning devices, and a combination thereof.

5. The assembly of claim 1 wherein the one or more antenna devices comprise one or more of a group consisting of radio frequency antenna devices including radio frequency proximity fuse antenna devices, radio frequency antenna devices for receiving and transmitting data communications, and radio frequency antenna devices for global positioning systems.

6. The assembly of claim 1 wherein the first processor device is selected from a group consisting of a microprocessor, a computer device having one or more microprocessor central processing units (CPUs), a microcomputer device, a computer with a guidance, navigation and control (GN&C) controller, and a combination thereof.

7. The assembly of claim 1 wherein the second processor device is selected from a group consisting of computers such as laptop computers, desktop computers, and notebook computers, a microprocessor, a computer device having one or more microprocessor central processing units (CPUs), a microcomputer device, handheld computer devices such as handheld tablet computers and mobile smartphones, a computer with a guidance, navigation and control (GN&C) controller, and a combination thereof.

8. The assembly of claim 1 wherein the data obtained by the plurality of imaging and sensing devices comprises a plurality of images including video images and high resolution streaming optical/IR (infrared) video images, raw data, radar images, microwave images, and a combination thereof.

9. The assembly of claim 1 wherein the power supply comprises one or more of a group consisting of one or more batteries, one or more solar panels, solar cells, solar modules, multi-junction solar cells, fuel cells, an internal combustion engine powered generator system, and a combination thereof.

10. An imaging and sensing assembly dispenser system, the dispenser system comprising:
   a dispenser device having a plurality of storage slots extending from a position near a central portion of the dispenser device to an external surface of the dispenser device, the storage slots shaped to house one or more imaging and sensing assemblies, each imaging and sensing assembly comprising:
      a disc shaped aerodynamic member configured to spin and self-position in flight;
      a plurality of pulsed thrusters positioned on the aerodynamic member;
      a plurality of imaging and sensing devices positioned along a perimeter of the aerodynamic member;
      one or more antenna devices positioned on the aerodynamic member and in communication with a first processor device on the aerodynamic member, the first processor device receiving data obtained by the plurality of imaging and sensing devices and wirelessly transmitting the data to a second processor device not positioned on the aerodynamic member; and,
      a power supply powering the imaging and sensing assembly;
   a communication system coupled to the dispenser device and configured to communicate data between the dispenser device and the one or more imaging and sensing assemblies; and,
   one or more ejection devices to eject the one or more imaging and sensing assemblies out of the dispenser device.

11. The system of claim 10 wherein the dispenser system further comprises multiple sensor devices including optical/IR (infrared) sensor devices, radar sensor devices, and laser illuminator devices housed in the dispenser device.

12. The system of claim 10 wherein the one or more ejection devices comprise one or more launcher barrels, one or more ejection charges, and rack and pinion devices and belt devices to spin the imaging and sensing assemblies.

13. The system of claim 10 wherein the communication system comprises one or more antenna devices coupled to the dispenser device and one or more dispenser processor devices coupled to the dispenser device.

14. A method for imaging, sensing and obtaining data, the method comprising:
   ejecting an imaging and sensing assembly from a dispenser system attached to a structure, the imaging and sensing assembly comprising:
      a disc shaped aerodynamic member configured to spin and self-position in flight;
      a plurality of pulsed thrusters positioned on the aerodynamic member;
      a plurality of imaging and sensing devices positioned along a perimeter of the aerodynamic member; and,
      one or more antenna devices positioned on the aerodynamic member and in communication with a first processor device on the aerodynamic member;
   spinning the disc shaped aerodynamic member while in flight;
   obtaining data from the plurality of imaging and sensing devices; and,
   transmitting the data to a second processor device for processing.

15. The method of claim 14 further comprising prior to ejecting the imaging and sensing assembly from the dispenser system, attaching the dispenser system to a flight vehicle and housing the second processor device in the flight vehicle.

16. The method of claim 14 further comprising prior to obtaining data from the plurality of imaging and sensing devices, using a global positioning system (GPS) radio frequency antenna device to guide the imaging and sensing assembly to a precise location.

17. The method of claim 14 wherein the obtaining data from the plurality of imaging and sensing devices further comprises obtaining a plurality of images via one or more camera imaging and sensing devices including push broom optics with a linear focal plane array.

18. The method of claim 14 wherein the transmitting the data to the second processor device further comprises delivering high resolution streaming optical/IR (infrared) video images of one or more objects or locations not in view of one or more occupants in a flight vehicle.

19. The method of claim 14 wherein the method further comprises performing in flight surveillance and reconnaissance with the imaging and sensing assembly.

20. The method of claim 14 wherein the method further comprises performing ground based surveillance and reconnaissance with the imaging and sensing assembly.

* * * * *